(No Model.)
I. LISSNER.
HEATING STOVE.
No. 495,349.
Patented Apr. 11, 1893.
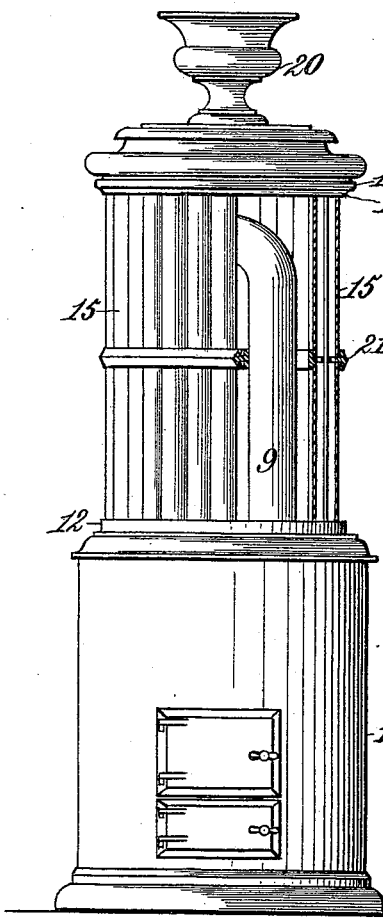
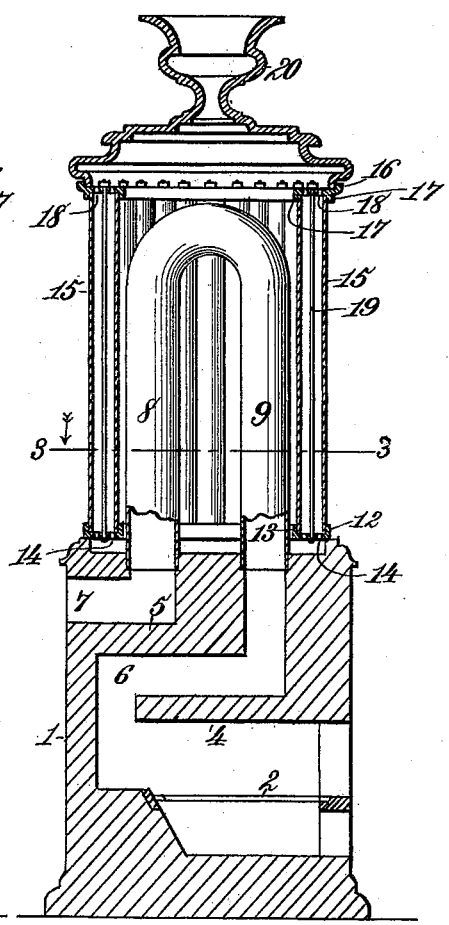
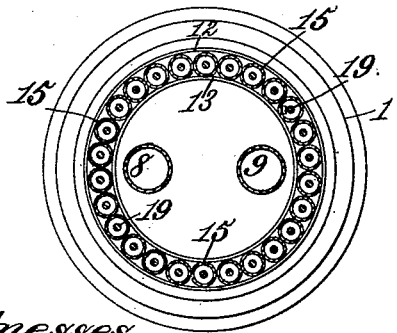
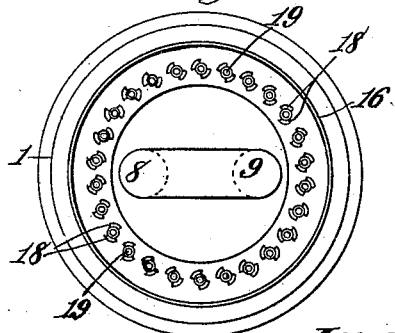
Witnesses.
Inventor:
Ignaz Lissner.

UNITED STATES PATENT OFFICE.

IGNAZ LISSNER, OF KAMENZ, GERMANY.

HEATING-STOVE.

SPECIFICATION forming part of Letters Patent No. 495,349, dated April 11, 1893.

Application filed June 28, 1892. Serial No. 438,321. (No model.)

*To all whom it may concern:*

Be it known that I, IGNAZ LISSNER, factory officer of Kamenz, a subject of the Emperor of Germany, residing at Kamenz, Saxony, Germany, have invented certain new and useful Improvements in Heating-Stoves; and I do hereby declare the following to be a full, clear, and exact description of the invention, such as will enable others skilled in the art to which it appertains to make and use the same.

This invention has for its object to provide a new and improved heating stove, and it consists in the combination of a cylindrical base of iron, earthen ware, or majolica, which contains the fire grate and combustion chamber, a cylindrical section, surmounting the base and composed of tubes of glass or similar material, and a crown or cap section supported by the tubes, said tubes being connected at their upper and lower ends by flanged metallic rings and tie rods or bolts extending through the tubes and rings.

The invention is illustrated by the accompanying drawings, in which—

Figure 1, is a vertical central sectional view of a heating stove constructed in accordance with my invention. Fig. 2, is a sectional side elevation showing a modified construction. Fig. 3, is a sectional view taken on the line 3—3 Fig. 1, and Fig. 4, is a top plan view omitting the crown or cap section.

In order to enable those skilled in the art to make and use my invention I will now describe the same in detail, referring to the drawings wherein—

The numeral 1 indicates a cylindrical base which may be composed of iron, glazed earthen ware or majolica, and contains a fire grate 2, horizontal partitions 4 and 5, a tortuous passageway 6, and an exit passage 7, for the products of combustion. The tortuous passageway 6 is connected with the exit passage 7 through the medium of a smoke pipe composed of two cylindrical members 8 and 9, connected at the upper end by an elbow 10, in such manner that the products of combustion from the passageway 6 ascend through the member 9 and descend through the member 8 of the smoke pipe into the exit passage 7. The top portion of the cylindrical base 1 supports a ring or annulus 12, having inner and outer vertical flanges 13, and perforations 14 for the passage of hot air. The double flanged ring or annulus 12 sustains the lower ends of an annular series of tubes 15, composed of glass or similar material adapted to receive the heated air which passes through the perforations 14 in the ring or annulus. The upper ends of the annular series of glass tubes 15 are connected by a ring or annulus 16, having inner and outer flanges 17 and perforations 18, for the passage of heated air rising through the glass tubes. The double flanged rings 12 and 16, are connected by tie rods or bolts 19, one of which passes through every glass tube. These tie rods or bolts are secured in position through the medium of suitable screw nuts and serve to clamp the series of tubes and hold them in proper upright position. The annular series of tubes surround the smoke pipe and an ornamental crown or cap section 20 rests upon the upper flanged ring 16. The glass tubes 15 may extend continuously from the lower flanged ring 12 to the upper flanged ring 16, but as illustrated in Fig. 2, the tubes may be composed of sections with a ring 21 interposed between the adjacent ends of the sections. The tubes are heated by radiation from the smoke pipe and since heated air can enter inside the tubes through the perforations 14, they are uniformly heated and a circulation of hot air is provided.

Having thus described my invention, what I claim is—

1. A heating stove consisting of a cylindrical base having passages 6 and 7 separated by a partition 5, a smoke pipe composed of members 8 and 9 connected by an elbow and communicating respectively with the passages in the cylindrical base, an annular series of tubes located above the base and provided at each end with a ring or annulus, and tie rods or bolts passing through the tubes and the rings, substantially as described.

2. A heating stove consisting of a cylindrical base having a tortuous passageway 6 and an exit passage 7, separated one from the other by a partition 5, a smoke pipe composed of two members 8 and 9 connected by an elbow 10 and communicating respectively with the tortuous passageway and the exit passage, an annular series of tubes arranged vertically above the base and provided at each end with a flanged ring having perforations for the passage of hot air, tie rods or bolts extending through the tubes and rings, and a crown or cap section 20 surmounting the tubes, substantially as described.

3. A heating stove consisting of a cylindrical base containing a fire grate and combustion chamber, a cylindrical section surmounting the base and composed of glass tubes connected at the top and bottom by double flanged metal rings, tie rods or bolts extending through the glass tubes and connected with the double flanged rings, and a crown or cap section surmounting the tubes, substantially as described.

In testimony whereof I affix my signature in presence of two witnesses.

IGNAZ LISSNER.

Witnesses:
  W. MAJDERICK,
  HERNANDO DE SOTO.